US010817531B2

(12) United States Patent
Sinha et al.

(10) Patent No.: US 10,817,531 B2
(45) Date of Patent: Oct. 27, 2020

(54) TARGETED MULTI-DIMENSION DATA EXTRACTION FOR REAL-TIME ANALYSIS

(71) Applicant: PayPal, Inc., San Jose, CA (US)

(72) Inventors: Ayon Sinha, Sunnyvale, CA (US); Rabi Chakraborty, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 142 days.

(21) Appl. No.: 15/496,976

(22) Filed: Apr. 25, 2017

(65) Prior Publication Data

US 2017/0228446 A1 Aug. 10, 2017

Related U.S. Application Data

(63) Continuation of application No. 14/961,050, filed on Dec. 7, 2015, now Pat. No. 9,633,096, which is a continuation of application No. 12/705,940, filed on Feb. 15, 2010, now Pat. No. 9,208,453.

(60) Provisional application No. 61/152,519, filed on Feb. 13, 2009.

(51) Int. Cl.
*G06F 16/25* (2019.01)
*G06F 16/28* (2019.01)
*G06F 16/9535* (2019.01)
*G06F 16/2457* (2019.01)
*G06Q 10/00* (2012.01)
*G06Q 30/02* (2012.01)

(52) U.S. Cl.
CPC ...... *G06F 16/254* (2019.01); *G06F 16/24578* (2019.01); *G06F 16/282* (2019.01); *G06F 16/9535* (2019.01); *G06Q 10/00* (2013.01); *G06Q 30/02* (2013.01)

(58) Field of Classification Search
CPC .. G06F 16/254; G06F 16/282; G06F 16/9535; G06F 16/24578
See application file for complete search history.

(56) References Cited

U.S. PATENT DOCUMENTS

| 6,223,215 | B1 | 4/2001 | Hunt |
| 9,208,453 | B2 | 12/2015 | Sinha et al. |
| 9,633,096 | B2 | 4/2017 | Sinha et al. |
| 2002/0004733 | A1 | 1/2002 | Addante |
| 2002/0116249 | A1 | 8/2002 | Ellinger |

(Continued)

OTHER PUBLICATIONS

This application is a Continuation of, U.S. Appl. No. 14/961,050, filed Dec. 7, 2015, Patented, U.S. Pat. No. 9,633,096.

(Continued)

*Primary Examiner* — James Trujillo
*Assistant Examiner* — Kurt A Mueller

(57) ABSTRACT

Methods and systems for extracting targeted data for real-time reporting are discussed. In an example, a system can include a data store, a server, and a denormalized database. The data store can maintain data created by an application. The server can be communicatively coupled to the data store. The server can include a data extraction module and a data compression module. The data extraction module can extract a subset of the data stored in the data store according to an extraction scheme. The data compression module can compress the extracted subset of the data into a set of aggregated key value pairs. The denormalized database can store the aggregated key value pairs.

20 Claims, 13 Drawing Sheets

(56) References Cited

U.S. PATENT DOCUMENTS

| | | | |
|---|---|---|---|
| 2004/0064443 A1 | 4/2004 | Taniguchi | |
| 2004/0111530 A1* | 6/2004 | Sidman | H04L 29/06 709/245 |
| 2005/0065756 A1* | 3/2005 | Hanaman | G06Q 10/0875 703/2 |
| 2006/0173926 A1* | 8/2006 | Kornelson | G06F 17/30563 |
| 2008/0010287 A1* | 1/2008 | Hinton | H04L 29/12594 |
| 2008/0162574 A1* | 7/2008 | Gilbert | G06Q 10/06375 |
| 2008/0214153 A1* | 9/2008 | Ramer | G06F 17/30749 455/414.1 |
| 2009/0006478 A1 | 1/2009 | Rikhtverchik | |
| 2009/0018996 A1* | 1/2009 | Hunt | G06Q 30/02 |
| 2010/0223244 A1 | 9/2010 | Sinha et al. | |
| 2016/0085833 A1 | 3/2016 | Sinha et al. | |

OTHER PUBLICATIONS

Is a continuation of, U.S. Appl. No. 12/705,940, filed Feb. 15, 2010, Patented, U.S. Pat. No. 9,208,453.

Claims Priority from Provisional Application, U.S. Appl. No. 61/152,519, filed Feb. 13, 2009, Expired.

U.S. Appl. No. 12/705,940, Final Office Action dated May 18, 2012, 23 pgs.

U.S. Appl. No. 12/705,940, Final Office Action dated Mar. 3, 2015, 23 pgs.

U.S. Appl. No. 12/705,940, Final Office Action dated Dec. 4, 2013, 21 pgs.

U.S. Appl. No. 12/705,940, Non Final Office Action dated Feb. 6, 2012, 23 pgs.

U.S. Appl. No. 12/705,940, Non Final Office Action dated Apr. 4, 2014, 22 pgs.

U.S. Appl. No. 12/705,940, Non Final Office Action dated Aug. 22, 2013, 21 pgs.

U.S. Appl. No. 12/705,940, Notice of Allowance dated Jul. 31, 2015, 5 pgs.

U.S. Appl. No. 12/705,940, Response filed Mar. 4, 2014 to Final Office Action dated Dec. 4, 2013, 14 pgs.

U.S. Appl. No. 12/705,940, Response filed May 7, 2012 to Non Final Office Action dated Feb. 6, 2012, 15 pgs.

U.S. Appl. No. 12/705,940, Response filed Jul. 2, 2015 to Final Office Action dated Mar. 3, 2015, 15 pgs.

U.S. Appl. No. 12/705,940, Response filed Jul. 7, 2014 to Non Final Office Action dated Apr. 4, 2014, 13 pgs.

U.S. Appl. No. 12/705,940, Response filed Aug. 20, 2012 to Final Office Action dated May 18, 2012, 15 pgs.

U.S. Appl. No. 12/705,940, Response filed Nov. 21, 2013 to Non Final Office Action dated Aug. 22, 2013, 15 pgs.

Dean, J., et al., MapReduce: Simplified Data Processing on Large Clusters, USENIX Association OSDI '04: 6th Symposium on Operating Systems Design and Implementation, (2004), 137-149.

Entire Prosecution History of U.S. Appl. No. 14/961,050, titled Targeted Multi-Dimension Data Extraction for Real-Time Analysis, filed Dec. 7, 2015.

Entire Prosecution History of U.S. Appl. No. 12/705,940, titled Targeted Multi-Dimension Data Extraction for Real-Time Analysis, filed Feb. 15, 2020.

\* cited by examiner

Report Date – Thu, 29 Jan, 2009

<<prev day                                              next day>>

Other Drillable Dimensions | L1Category : Experiment ID : Page |

Site: EBAY_MAIN

| Hide | Page | Impression | VI | Watch | BID | BIN |
|---|---|---|---|---|---|---|
| ☐ | Search Results Page (AMI) | 58196512 | 44156338 | 4004219 | 1283477 | 349521 |
| ☐ | Search Results Page (AMI)(Title & Desc Search) | 1523152 | 1071837 | 155954 | 25944 | 6561 |
| ☐ | Seller's Other Items | 4249716 | 3193098 | 524333 | 297215 | 40179 |
| ☐ | Product Details Page | 528104 | 251354 | 32225 | 21872 | 6752 |
| ☐ | Hybrid Search | 17436 | 4133 | 539 | 197 | 73 |
| ☐ | Seller's Other Items(Title & Desc Search) | 16220 | 10420 | 1382 | 600 | 258 |
| ☐ | Search Results Page (AMI)(Completed Items Search) | 931152 | 469745 | 6682 | 4846 | 1381 |
| ☐ | Hybrid Search(Title & Desc Search) | 192 | 10 | 0 | 0 | 0 |
| ☐ | Seller's Other Items(Completed Items Search) | 96124 | 58007 | 1684 | 810 | 246 |
| ☐ | Dynamic Landing Page | 892 | 8 | 32 | 52 | 8 |
| ☐ | AMI Ajax(Title & Desc Search) | 2724 | 0 | 4 | 32 | 4 |

RESULTS TABLE

| DIMENSIONS | | | SUCCESS METRICS | | |
|---|---|---|---|---|---|
| Page ID | Module ID | Config. ID | Acct. Create | Lib. Create | Photo Upload |
| A-50 | M-45 | C-10 | 1 | 0 | 0 |
| A-50 | M-45 | C-11 | 3 | 0 | 0 |
| A-50 | M-45 | C-12 | 5 | 0 | 0 |
| A-50 | M-50 | C-12 | 1 | 0 | 0 |
| A-58 | M-60 | C-15 | 0 | 12 | 0 |
| A-58 | M-61 | C-20 | 0 | 2 | 0 |
| A-70 | M-70 | C-71 | 0 | 0 | 3 |

*FIG. 9*

```xml
<Configuration xmlns:xsi="http://www.w3.org/2001/XMLSchema-instance"
xsi:noNamespaceSchemaLocation="D:\Views\rchakraborty_view_587\metadata\schemas\MetricConfig.xsd">

<!-- Define what information parser will capture after parsing an input event
             The properties captured at parsing time will be used for following future decision making
                  1. Whether to ignore that event
                  2. Is it a tracked event. In that case it will be used to populate the session list which can get the
        credit from a success event
                  3. Is it a success event, in that case success score will be assigned to different tracked event The event class implementation will be through bean and all properties defined inside the event
             can be accessed using getter and setter of bean properties.
        -->

<Event class="com.ebay.finding.metrics.consumer.SOJEvent"
loader="com.ebay.finding.metrics.consumer.SOJEventExtractor">
                <property name="encounterNewSession" type="boolean"
handler="com.ebay.finding.metrics.consumer.NewSessionHandler"/>

<!-- If the above property is true then the handler class will be involved. Handler class will define
             a method handle which will take the original event as parameter. For the current case handler class
             will be defined to
                  Close the current session.
                  Populate the dimension key along with their score and
                  pass that output to map reduce framework for further reduction.
                  Open a new session.
        -->

<property name="GUID" type="String"/>
                <property name="Site" type="String"/>
                <property name="Page" type="String"/>
                <property name="Module" type="String"/>
                <property name="Configuration" type="String"/>
                <property name="Category" type="String"/>
                <property name="Keyword" type="String"/>
        </Event>

<!-- All the properties may return multi values if multiple of them surfaced inside single event -->
```

*FIG. 10*

```
<!-- Defining series of tracked events which will be consumed to generate the dimension keys.
The handler defined against the tracked event will be called once this type of event encounters
the system.
    User may define a generic handler for all tracked events or event specific handler
The handler for this particular case creates a page for each tracked event and maintain the list
of modules along with the configuration inside page. Here in the current example we define
tracked and action event based on Page Ids. Ideally any key or their combination defined inside
event structure cab be used to define a track or action event. -->
        <TrackedEvents handlerClass="com.ebay.finding.metrics.consumer.TrackedPageHandler">
            <TrackedEvent Page="3286"/>
            < TrackedEvent Page ="3910"/>
            < TrackedEvent Page ="3911"/>
        </TrackedEvents>
<!-- Action Handlers will be used to calculate the action score and associate score to the dimension
keys once action event is received by the system. -->
        <ActionEvents>
            < ActionEvent  Page="284"
                        handlerClass="com.ebay.finding.metrics.consumer.ViewItemHandler"/>
            < ActionEvent  Page="573"
                        handlerClass="com.ebay.finding.metrics.consumer.WatchItemHandler"/>
            < ActionEvent  Page="167"
                        handlerClass="com.ebay.finding.metrics.consumer.BidHandler"/>
            < ActionEvents  Page="4068"
                        handlerClass="com.ebay.finding.metrics.consumer.BinHandler"/>
        </ActionEvents>
<!- The combination of dimension keys along with the scores will be sent to the map reduce
framework once a user session is complete. Map Reduce Framework will combine the score if
two exactly same session key value appears using the user defined handler class -->
        <Dimensions separator=":">
            <CoreDimensions>
                <Key  name="Site"/>
                < Key  name="Page"/>
                < Key  name="Module"/>
                < Key  name="Configuration"/>
            </CoreDimensions>
            <AdditionaDimensions>
                <Key name="Category" type="pseudo"/>
                <Key name="L1Category" type="postProcess"
class="com.ebay.finding.metrics.L1CategoryPostProcessor" input="Category"/>
                <Key name="L2Category" type="postProcess"
class="com.ebay.finding.metrics.L2CategoryPostProcessor" input="Category"/>
                <Key name="Keyword"/>
            </AdditionaDimensions>
            <Scores aggregationHandler="com.ebay.finding.metrics.consumer.ScoreAggregator">
                <Key name="ViewScore" type="double"/>
                <Key name="BIDScore" type="double"/>
                <Key name="BINScore" type="double"/>
                <Key name="WatchScore" type="double"/>
            </Scores>
        </Dimensions>
</Configuration>
```

*FIG. 11*

TARGETED MULTI-DIMENSION DATA EXTRACTION FOR REAL-TIME ANALYSIS

CROSS REFERENCED TO RELATED APPLICATIONS

This application is a continuation of U.S. patent application Ser. No. 14/961,050, filed Dec. 7, 2015, and issued as U.S. Pat. No. 9,633,096 on Apr. 25, 2017, which is a continuation of U.S. patent application Ser. No. 12/705,940, filed Feb. 15, 2010, and issued as U.S. Pat. No. 9,208,453 on Dec. 8, 2015, which claims the benefit of priority of U.S. Provisional Application No. 61/152,519, filed Feb. 13, 2009, the contents of which are incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, eBay, Inc. All Rights Reserved.

BACKGROUND

Massive parallel distributed data processing systems are becoming common place in data extraction, transformation and loading (ETL) functions used to support data analytics operations at today's large online organizations. One such system developed by Google™ uses a MapReduce programming model for processing and generating large data sets. MapReduce is a programming methodology to perform parallel computations over distributed (typically, very large) data sets. Some theory regarding the MapReduce programming methodology is described in "MapReduce: Simplified Data Processing on Large Clusters," by Jeffrey Dean and Sanjay Ghemawat, appearing in OSDI'04: Sixth Symposium on Operating System Design and Implementation, San Francisco, Calif., December, 2004 (hereafter, "Dean and Ghemawat"). A similar, but not identical, presentation is also provided in HTML form at the following URL: http://labs.google.com/papers/mapreduce-osdi04-slides/index.html (hereafter, "Dean and Ghemawat HTML").

Basically, a "map" function maps key-value pairs to new (intermediate) key-value pairs. A "reduce" function represents all mapped (intermediate) key-value pairs sharing the same key to a single key-value pair or a list of values. The "map" and "reduce" functions are typically user-provided. The map function iterates over a list of independent elements, performing an operation on each element as specified by the map function. The map function generates intermediate results. The reduce operation takes these intermediate results via a single iterator and combines elements as specified by the reduce function.

BRIEF DESCRIPTION OF DRAWINGS

Some embodiments are illustrated by way of example and not limitation in the figures of the accompanying drawings in which:

FIG. 6 is a report illustrating output produced from the results of targeted data extraction and compression, according to an embodiment.

FIG. 9 illustrates a results table, according to an example embodiment.

FIGS. 10 and 11 are code listings illustrating a data extraction scheme, according to an example embodiment.

DETAILED DESCRIPTION

Figure 1:
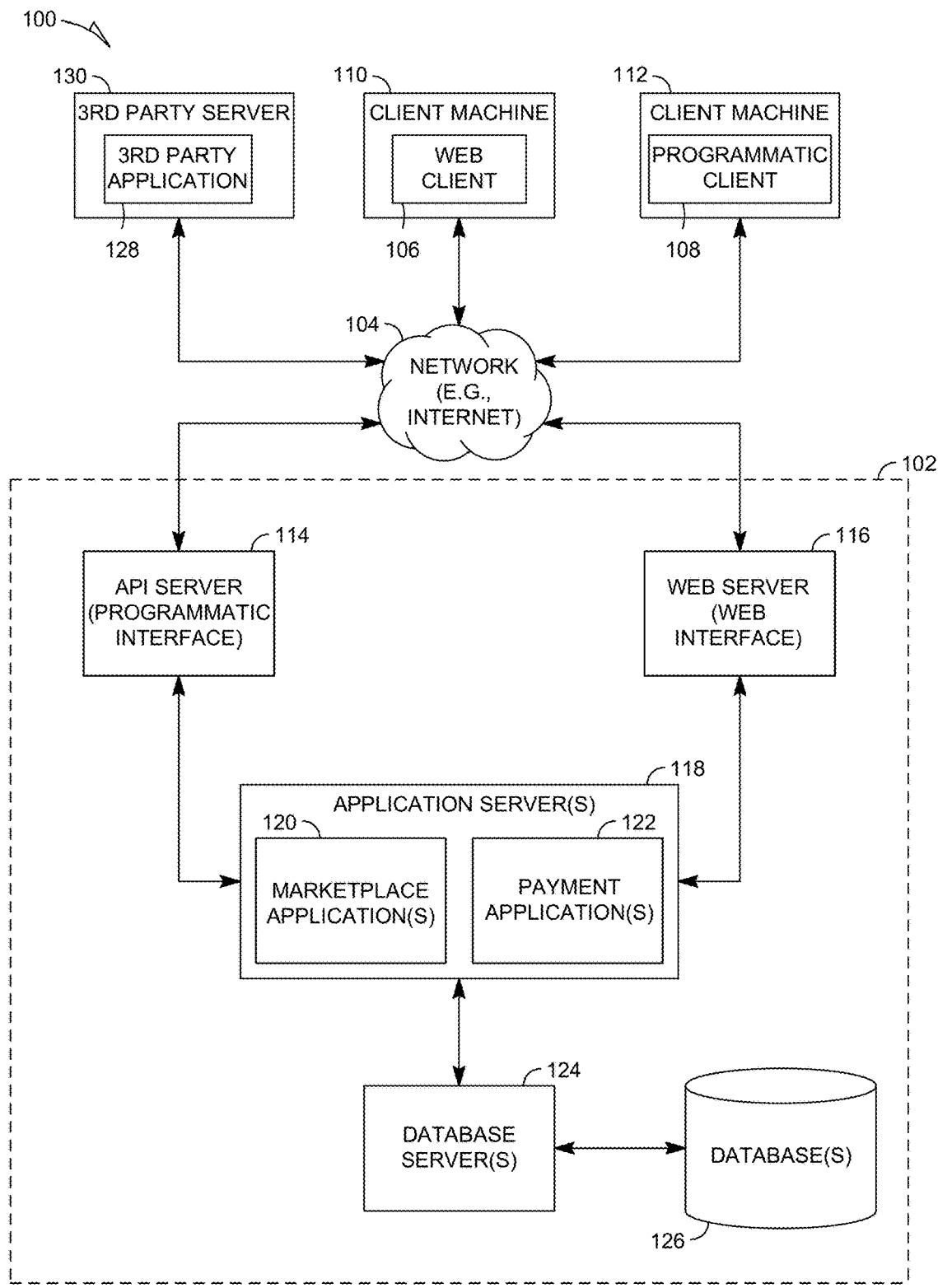
FIG. 1 is a system block diagram illustrating an online networked application system, according to an example embodiment.

In the following description, for purposes of explanation, numerous specific details are set forth in order to provide a thorough understanding of some example embodiments. It will be evident, however, to one skilled in the art that the present invention may be practiced without these specific details.

The term "transactional" in the following description is not limited to the procession of purchasing a product or service. The term "transactional" is only met to describe a system capable of logging user actions taken while interacting with the system. As such, the following description includes discussion relevant to online applications including, e-commerce, auctions, marketplace, banking, social networking, or news. Additionally, the following description is applicable to just about any software application delivered over the internet, or a private network, in the form of software as a service (SaaS).

Embodiments for extracting, compressing, and generating reports from online transactional or web analytics data are described. An exemplary targeted multi-dimensional data extraction system allows domain-specific transactional data to be extracted from a large generic data store providing significant reduction in the volume of data while retaining detailed data for domain-specific reporting.

In some embodiments, the data extraction system enables domain experts to tailor the data extraction and compress to focus on only the metrics of interest. This targeted approach ignores or filters the typically large amount of noise collected by large transactional web sites through logging functions. By targeting only the data required by a specific domain (e.g., online search, account management, or category specific sales teams), huge raw data stores can be filtered down into manageable highly focused data sets.

In some embodiments, the extracted and aggregated data sets are loaded into denormalized databases to enable near real-time reporting. While denormalized databases require greater amounts of storage, as compared with a fully normalized relational database, they are significantly more efficient in terms of speed and processing power requirements. In these embodiments, the space requirements of the denormalized database is mitigated by the significant compression of data during the extraction and aggregation step, as much as 160 times in some embodiments depending on the granularity of the remaining data.

In some embodiments, the data extraction and aggregation focuses on tracking success metrics associated with a users activities within the transactional web-based environment. Success metrics can include account creation, a product or service purchase, the posting of a photograph, commenting on a friends status, or any determinable online action taken by a user. In addition to success metrics, some embodiments track navigation events leading up to the success metric. A navigation event (also referred to as a tracking event) is a recorded transaction or operation taken by a user within the online system. In certain embodiments, all navigation events can be tracked that led to success metrics of interest. In other embodiments, certain navigation events can be ignored, further reducing the volume of data extracted. In these embodiments, the domain expert can define either only those navigation events they wish to track or the specific navigation events they wish to ignore.

In some embodiments, the data extraction and aggregation mechanism are configured to collect individual identifying information, including page IDs, module IDs, configuration IDs, and various levels of category. This granular data is referred to as dimensions. The domain expert is provided the ability to select dimensions of interest leading to a success metric. In certain embodiments, the success metric is attributed or scored back to a unique combination of dimensions that led to the success metric.

In various embodiments, once the data is extracted and the success metrics are attributed to various unique combinations of dimension, the collected data is aggregated and stored in a database. In some embodiments, the aggregation process uses a key/value pair aggregation mechanism. In certain embodiments, the unique combination of dimensions becomes the key with the score (or success metric attribution) being the value. In some embodiments, aggregation is done by simply totaling all observed success metrics associated with each unique dimension combination. In other embodiments, aggregation is done through an averaging function or other logical functions.

FIG. 1 is a system block diagram illustrating an online networked application system 100, according to an example embodiment. The networked system 102, provides the infrastructure for an online transactional system capable of generating the kind of raw data operated on by various embodiments discussed herein. As mentioned above, the networked system 102, can provide various online application environments including, e-commerce, auctions, banking, or social networking, to name just a few. Additionally, the methods and system for data extraction and aggregation discussed below can also be beneficially applied to offline application environments that generate or manipulate large volumes of data. The details of FIG. 1 are included below in the section of this document focused on platform architecture.

Data Extraction, Aggregation, and Reporting System

Figure 2:
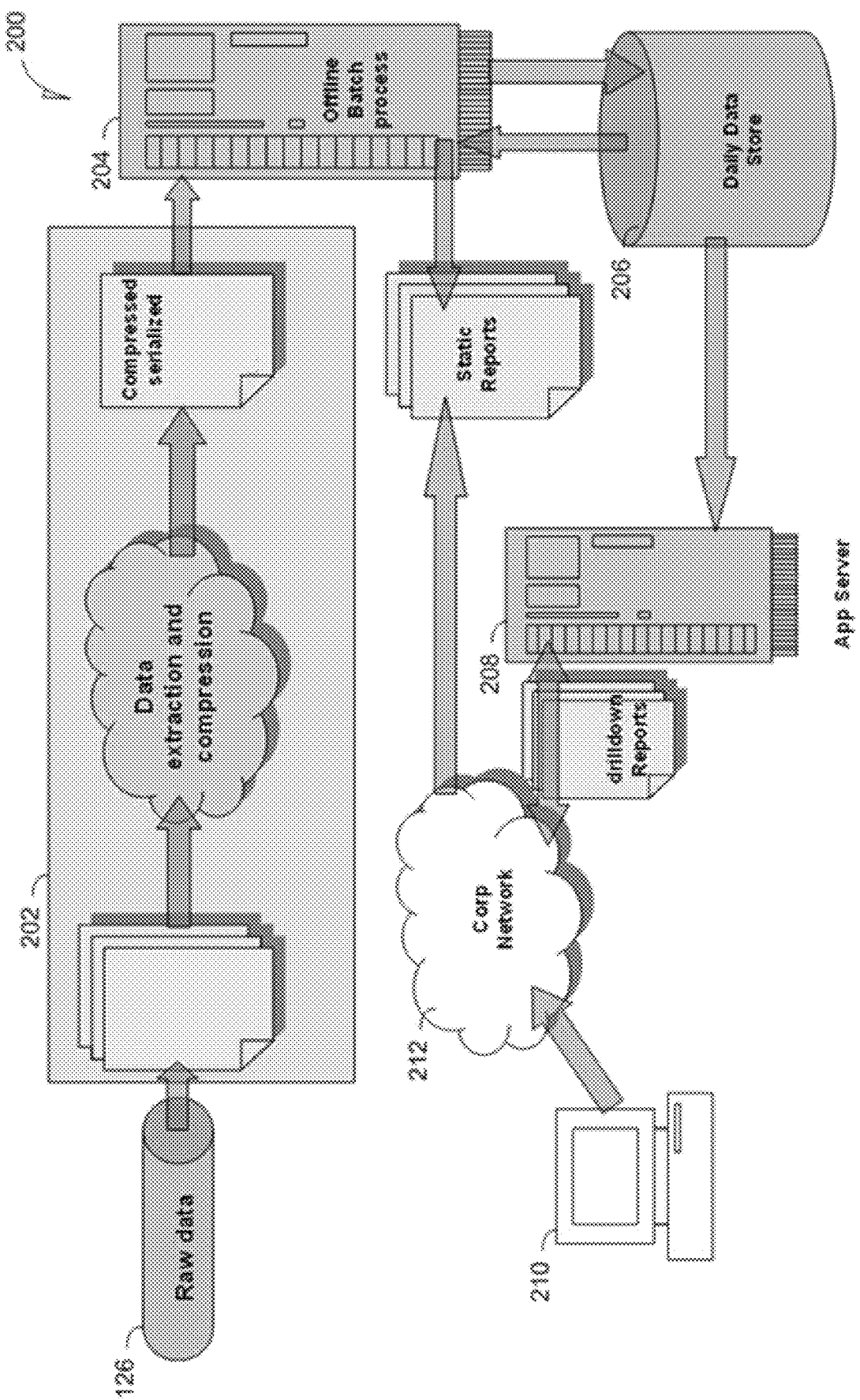
FIG. 2 is a block diagram illustrating a system for data extraction, compression, and reporting, according to an example embodiment.

FIG. 2 is a block diagram illustrating a system for data extraction, compression, and reporting, according to an example embodiment. A system 200 includes a data store 126, a data extraction and compression module 202, an off-line batch processing server 204, a daily data store 206, an application server 208, a client device 210 and a corporate network 212. In this example, the data store 126 contains raw transaction data generated by an application, such as the online application system 100. In some examples, the data store 126 is a stream of data received from an application as it is generated. In certain embodiments, the data extraction and compress module 202 runs on the off-line batch processing server 204 and feeds output into the daily data store 206. In some embodiments, the application server 208 is configured to pull data from the daily data store 206 at the request of the client 210. In these embodiments, the application server 208 contains programming that allows the client 210 to generated real-time drill down reports from data in the daily data store 206.

In some embodiments, system 200 generates static reports concerning the data extraction and compression module 202. In certain embodiments, the static reports are general overview reports related to the operations of the data extraction and compression module 202. In other embodiments, the static reports are pre-configured by domain experts as part of the data extraction and compress process. In these embodiments, the static reports provide domain specific details regarding the raw transactional data 126 processed by the data extraction and compress module 202.

Figure 3:
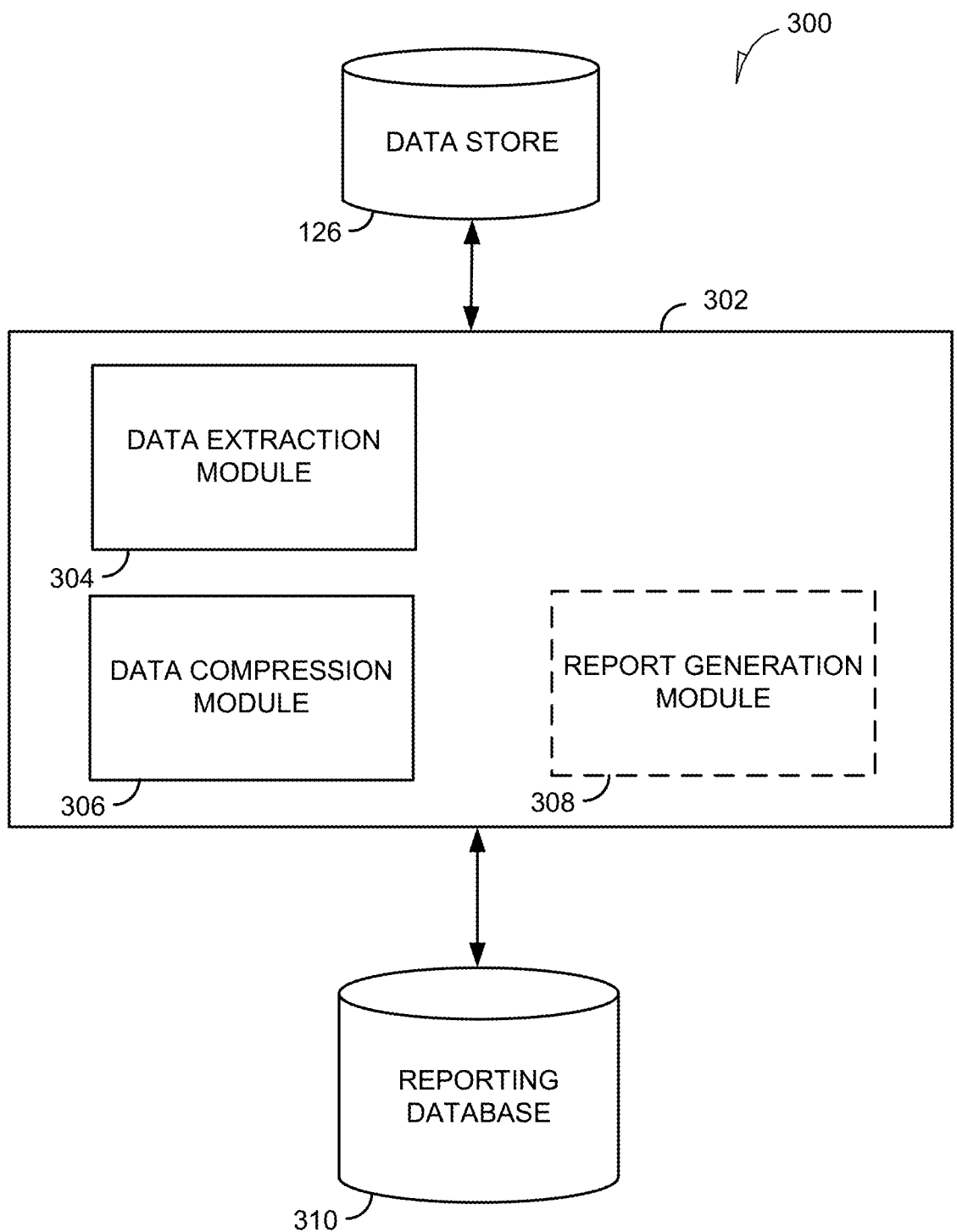
FIG. 3 is a block diagram illustrating a system for data extraction and compression, according to an example embodiment.

FIG. 3 is a block diagram illustrating a system for data extraction and compression, according to an example embodiment. A system 300 includes a data store 126, a processing server 302, a data extraction module 304, a data compression module 306, a reporting database 310, and an optional report generation module 308. Transactional data store may be any data store that is used, at least in part, to store data related to transactions. In some embodiments, the processing server 302 is configured to extract and compress targeted data sets from the data store 126. The targeted data extraction is handled by the data extraction module 304. The data extraction module 304 is operationally coupled to the data store 126. In certain embodiments, the data extraction module reads records stored during a user or visitor session and extracts data identified as relevant by a domain expert. In these embodiments, once the targeted data is extracted, the data is passed on to the data compression module 306. In certain embodiments, the data compression module 306 aggregates similar data entries providing varying levels of data compression depending upon the granularity of the extracted data.

In some embodiments, once the data has been extracted and compressed the resulting targeted data set is stored in the reporting database 310. In certain embodiments, the reporting database is configured as a denormalized database to provide optimal report generation performance, at the expense of overall data storage space requirements. A denormalized database typically uses a flat table structure with large amounts of redundant data to optimize throughput and minimize query complexity. In other embodiments, the reporting database is configured as a normalized relational database to minimize storage overall requirements. In certain embodiments, the report generation module 308 accesses the reporting database 310 to generate various reports from the extracted data sets.

Figure 4:
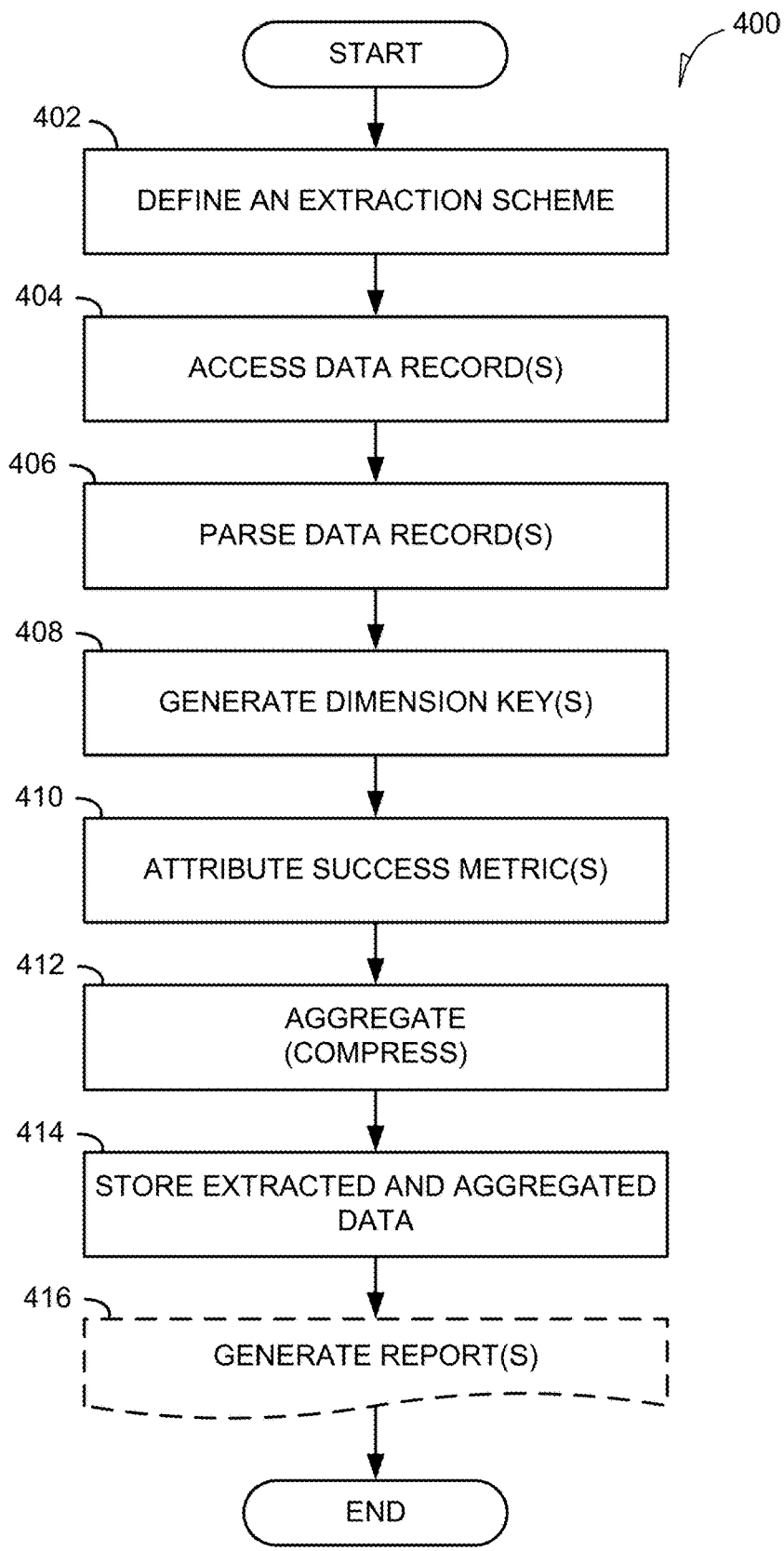
FIG. 4 is a flow chart illustrating a method to extract and compress targeted transactional data, according to an example embodiment.

FIG. 4 is a flow chart illustrating a method 400 to extract and compress targeted transactional data, according to an example embodiment. The method 400 includes operations such as, defining a extraction scheme at 402, accessing data records at 404, parsing data records at 406, generating dimension keys at 408, attributing success metrics at 410, aggregating data at 412, and storing extracted and aggregated data at 414. Optionally, the method 400 can also include an operation for generating reports at 416. In an embodiment, the method 400 details an example of targeted multi-dimension data extraction for real-time analysis. The description of the method 400 may include references back to system components discussed in relation to FIGS. 1-3, these references are by way of example not limitation.

Figure 5:
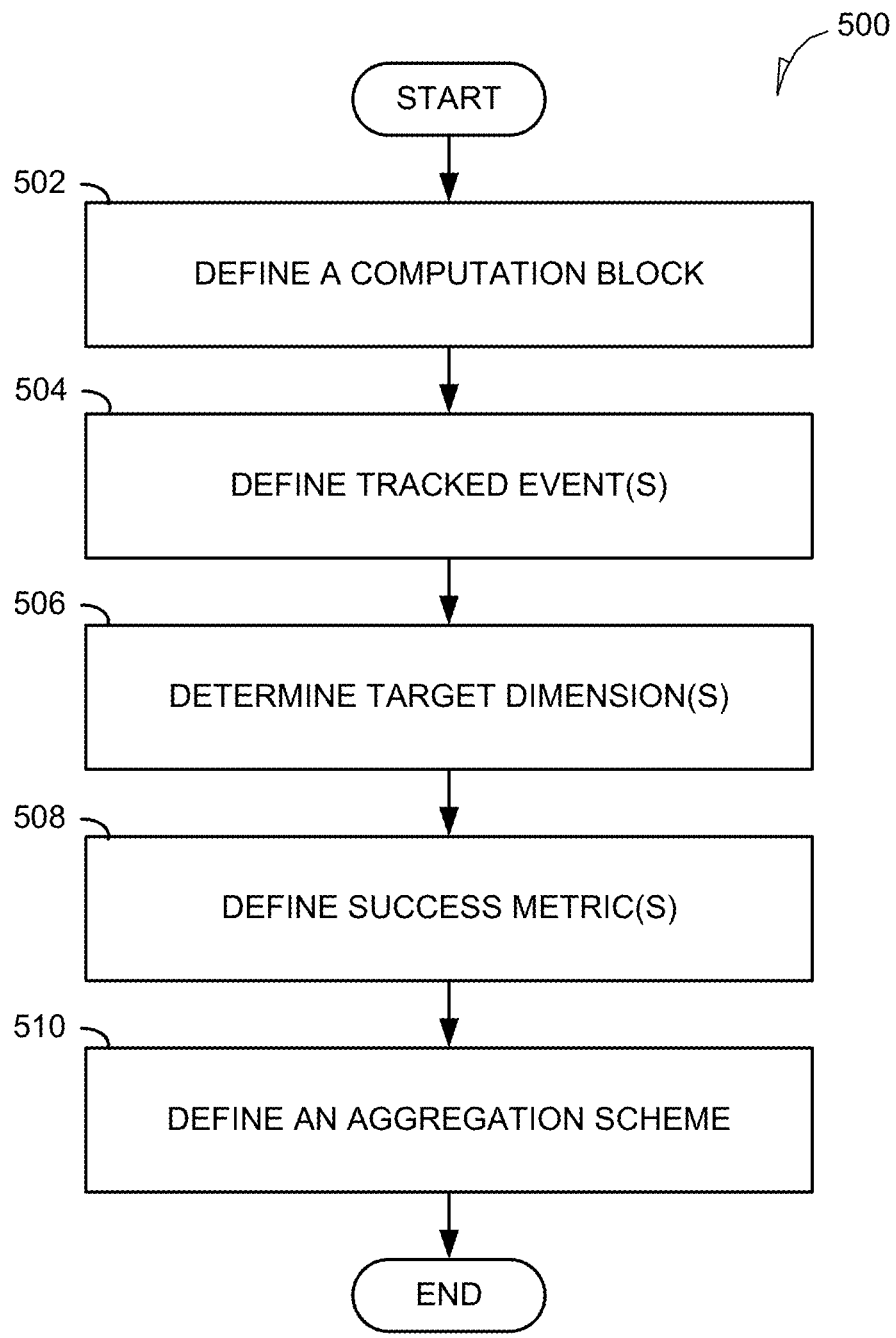
FIG. 5 is a flow chart illustrating a method of creating a data extraction scheme, according to an example embodiment.

In some embodiments, the method 400 begins at 402 with the definition of an extraction scheme. An extraction scheme provides business domain experts with the ability to define detailed criteria for the extraction and compression of raw transactional data. FIG. 5 is a flow chart illustrating a method 500 of creating a data extraction scheme, according to an example embodiment. The method 500 begins at 502 by defining a computation block. In certain embodiments, a computation block defines a logical session of interaction with an online application system 100. In some embodiments, the computation block includes a user session starting with a user login and ending with the user logging out. In another embodiment, the computation block includes a user session defined by cookie set when the user first arrives on the web site and ending when the user navigates away from the web site. In yet another embodiment, the computation block includes a user session defined only by the user session tracking mechanism used by the web application or server, essentially just a user ID. In this embodiment, the computation block may not have a specific start or end, as it is possible for a user ID to persist over multiple visits. One purpose of the computation block is to provide flexibility on how user sessions are tracked and reported through the data extraction and compression system 200.

The method 500 continues at 504 by defining tracked events. Tracked events were also referred to as navigation events above. In certain embodiments, tracked events include any action taken by the user in interaction with the online application environment. In addition, in some embodiments, tracked events include a list of specific actions (e.g., page views, searches, uploads, comments, tagging) taken by the user while interacting with the online system 100. One purpose of defining tracked events is to provide an additional filter mechanism during data extraction. For example, if the business domain expert determines that a segment of the pages on an online banking web site do not pertain to the targeted data extraction, these pages can be excluded from the tracked events.

At 506, the method 500 continues by determining target dimensions. In certain embodiments, dimensions can include individual identifying information pieces associated with the online application system 102. In some embodiments, dimensions can include information that identifies the programmable aspects of a web application. For example, in an e-commerce system a dimension includes page IDs, module IDs, configuration IDs, search terms, keywords, sort order and categories. Dimensions can include any data logged in the data store 126. Additionally, in some embodiments, pseudo dimensions are used to extract information during a post-extraction process that is not stored in the data store 126. For example, an e-commerce system that does not log a seller ID associated with product purchases utilizes another dimension, including order ID, as a pseudo dimension for seller ID. In this example, during post-extraction processing the offline batch processor 204 can look up the correct seller ID associated with each order ID and make the appropriate replacement.

Once the target dimensions are determined, the method 500 continues at 508 by defining success metrics. In some embodiments, a success metric represents a desired user action, including a product or service purchase, a photo upload, or an electronic funds transfer. Success metrics allow the business domain expert the ability to narrow the focus of the data extraction process 400. At 510 of the method 500 an aggregation scheme is defined. Aggregation allows for representation of potentially thousands of transactions within a single database row. In certain embodiments, aggregation is done through simply adding up the success metrics associated with a unique combination of dimensions. In additional embodiments, aggregation averages success metrics.

Returning to FIG. 4, the method 400 continues at 404 with the data extraction module 304 accessing data records. In an embodiment, the data records are accessed by a session ID. In another embodiment, the data records are accessed according to a computation block definition of a user session. At 406, the accessed data records are parsed. In an embodiment, the records are parsed according to events, tracked events, target dimensions and success metrics. In certain embodiments, tracked events are events that have been identified as being of particular interest to the targeted business domain.

At 408, the data extraction module 304 generates unique dimension keys. In an embodiment, unique dimension keys are generated from the parsing results by associating the dimension keys with the tracked events. A unique dimension key represents the unique configuration of the online application system at the time of the tracked event. For example, in a social networking system, a tracked event can include a user posting a comment to another user. For this example tracked event, a unique dimension key can include the particular page ID, the configuration ID, a language ID, and even a font ID (provided various fonts are available within the comment control).

At 410, once unique dimension keys have been generated for the extracted data, the data extraction module 304 can attribute the success metrics. In some embodiments, any success metrics associated with the tracked events are attributed to the unique dimension keys generated from the tracked events. In an embodiment, success metrics are attributed historically to some or all tracked events leading to the success metric. Attribution of the success metrics to the unique dimension key creates a key value pairing that can be transferred to the data compression module 306 for aggregation. At 412, the data extraction module 304 aggregates the unique dimension key success metric value pairs. In an embodiment, the aggregation is controlled by the extraction scheme.

In an embodiment, at 406 and 412 the data compression module 306 performs the primary data compression in method 400. At 406, in an example, only targeted data is parsed from the data records. While at 412, the extracted data is compressed through one or multiple methods of aggregation. In a particular example of compression performed on a particular set of raw transactional data, these methods of data compression took 80 Gbytes of raw transactional data and reduced it to 500 Mbytes, while maintaining detailed reporting for a targeted business domain.

Once the transactional data has been aggregated at 412, the method 400 can finish at 414 by storing the extracted and aggregated data in a database, such as the reporting database 310. At 416, the method 400 can continue with the report generation module 308 accessing the extracted and aggregated data to produce reports. FIG. 6 illustrates an example report 600 depicting output produced from the results of targeted data extraction and compression, according to the method 400.

Figure 7:
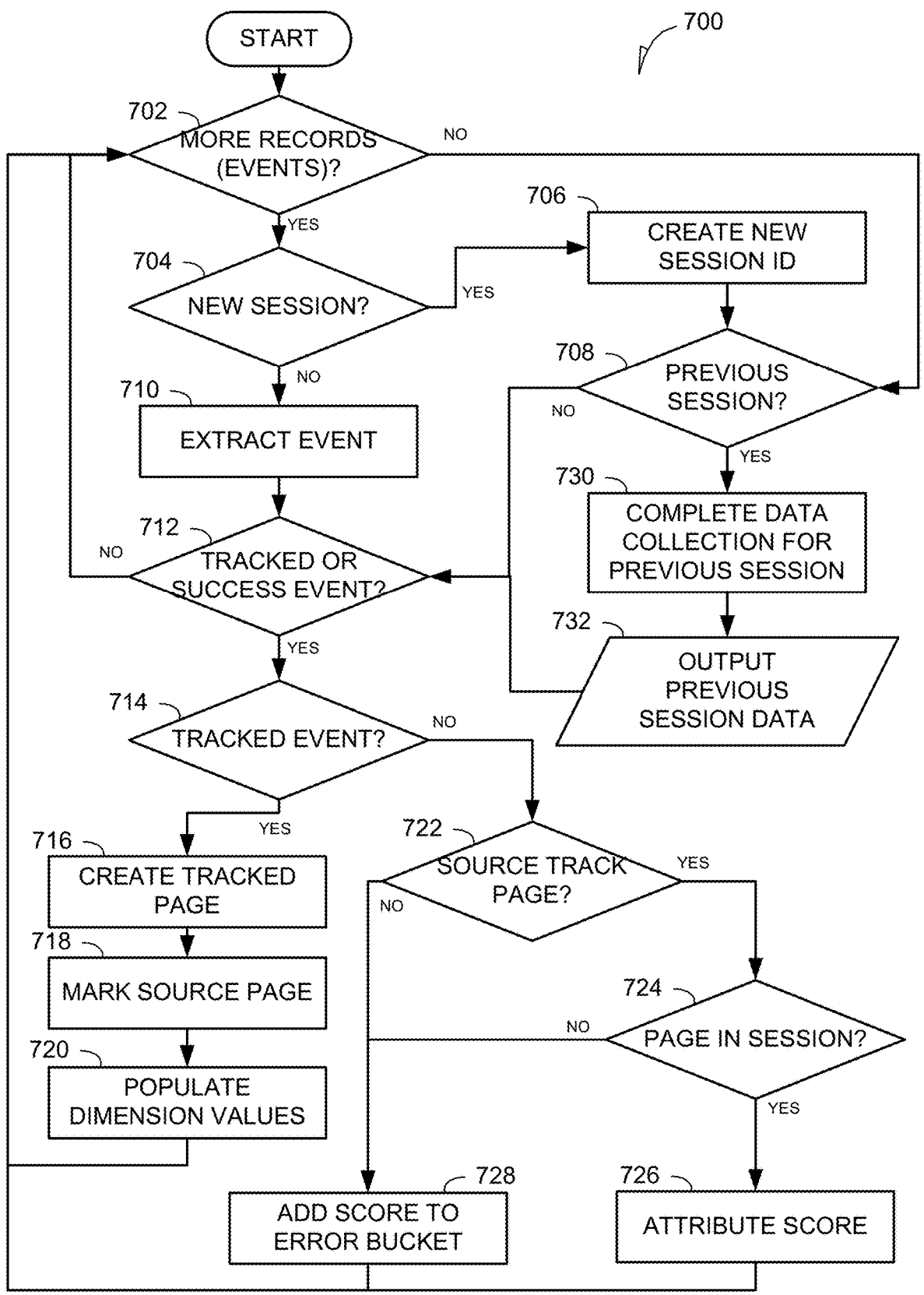
FIG. 7 is a flow chart illustrating a method of data extraction and aggregation, according to an example embodiment.

FIG. 7 is a flow chart illustrating a method 700 of data extraction and aggregation, according to an example embodiment. In an embodiment, the method 700 details an implementation of targeted multi-dimension data extraction for real-time analysis. The description of the method 700 may include references back to system components discussed in relation to FIGS. 1-3, these references are by way of example not limitation.

In an embodiment, the method 700 starts at 702 with the data extraction module 304 determining if there are records within the data store 126 that need to be processed. If no additional records are found, the data extraction module 304 continues at 708 by determining if a previous session needs to be completed. If there is a previous session, the data extraction module 304 continues at 730 by completing data collection for the previous session. In an embodiment, completing data collection includes populating the unique dimension keys with success metric scores for each tracked page in the previous session. In certain embodiments, consolidation of dimension scores, by addition, occurs if two tracked pages are encountered with the same dimension. Once dimension keys and success metric values (scores) have been collected, in certain embodiments, they are passed to a map reduce module running on the offline batch processor 204. In other embodiments, the dimension keys and success metric values are passed to the data compression module 306. In some embodiments, the data compression module 306 uses a map reduce framework to aggregate the data. At 708, if there is no previous session, the method 700 continues to operation 712 discussed below.

At 702, if the data extraction module 304 determines that additional records need to be processed, a record is extracted for processing. At 704, the data extraction module 304 determines if the record belongs to a new session. If the record belongs to a new session, the data extraction module 304 creates a new session ID at 706 and the old session, if any exists, is cleaned up as discussed above.

At 710, the data extraction module 304 extracts an event from the record, if one exists within the record. The data extraction module 304 then determines whether the event is a tracked event or a success event (metric) at 712. If the event is neither a tracked event nor a success metric, then processing returns to check for additional records at 702. If the data extraction module 304 determines that the event is a tracked event at 714, processing continues at 716. At 716, the data extraction module creates a tracked page. In some embodiments, the tracked page is used to represent the event within the data extraction module 304. In these embodiments, tracked pages are determined to be either active or inactive, depending on whether they are still in the user's current navigation path, as it is recorded in the raw transactional data. In an embodiment, the processing continues with the data extraction module 304 marking the tracked page's source page, if one exists. Marking a source page defines the navigation path, which can be used later for attribution of success metrics (events). In an embodiment, the final processing step for the tracked event is populating dimension values. At 720, the data extraction module 304 will determine what dimension keys are present in the current tracked event.

If the extracted event is not a tracked event, processing moves from 714 to 722, where the data extraction module 304 determines whether the event has a source page. In an embodiment, if the event does not have a source page associated, the data extraction module considers the event an error and adds the score to an error bucket at 728. If the event has a source tracked page, then the data extraction module 304 determines whether the tracked page is within the current session at 724. If the tracked page source is not in the current session the score is again attributed to the error bucket at 728. If the tracked page source is in the current session, the data extraction module attributes the score at 726. In some embodiments, as discussed above, score attribution can be done by dividing credit among the tracked page and its ancestors using a user defined algorithm.

In an embodiment, the data extraction module 304 uses one of three different scoring mechanisms. In certain embodiments, the total score is allotted to the source page of the success event (metric). In another embodiment, the score is distributed evenly among all pages in the navigation chain (source page chain). In yet another embodiment, the score is distributed by an algorithm that determines distance between tracked page and success event (metric). An example implementation of this embodiment is $S=X(1-R^N)/(1-R)$, where S is the total score, X is the portion of the score allotted to the parent tracked page of the success event (metric) and R is a multiplication factor at each level with the value of R usually being less than one to ensure grand-parent pages get a lower score than parent pages.

Figure 8:
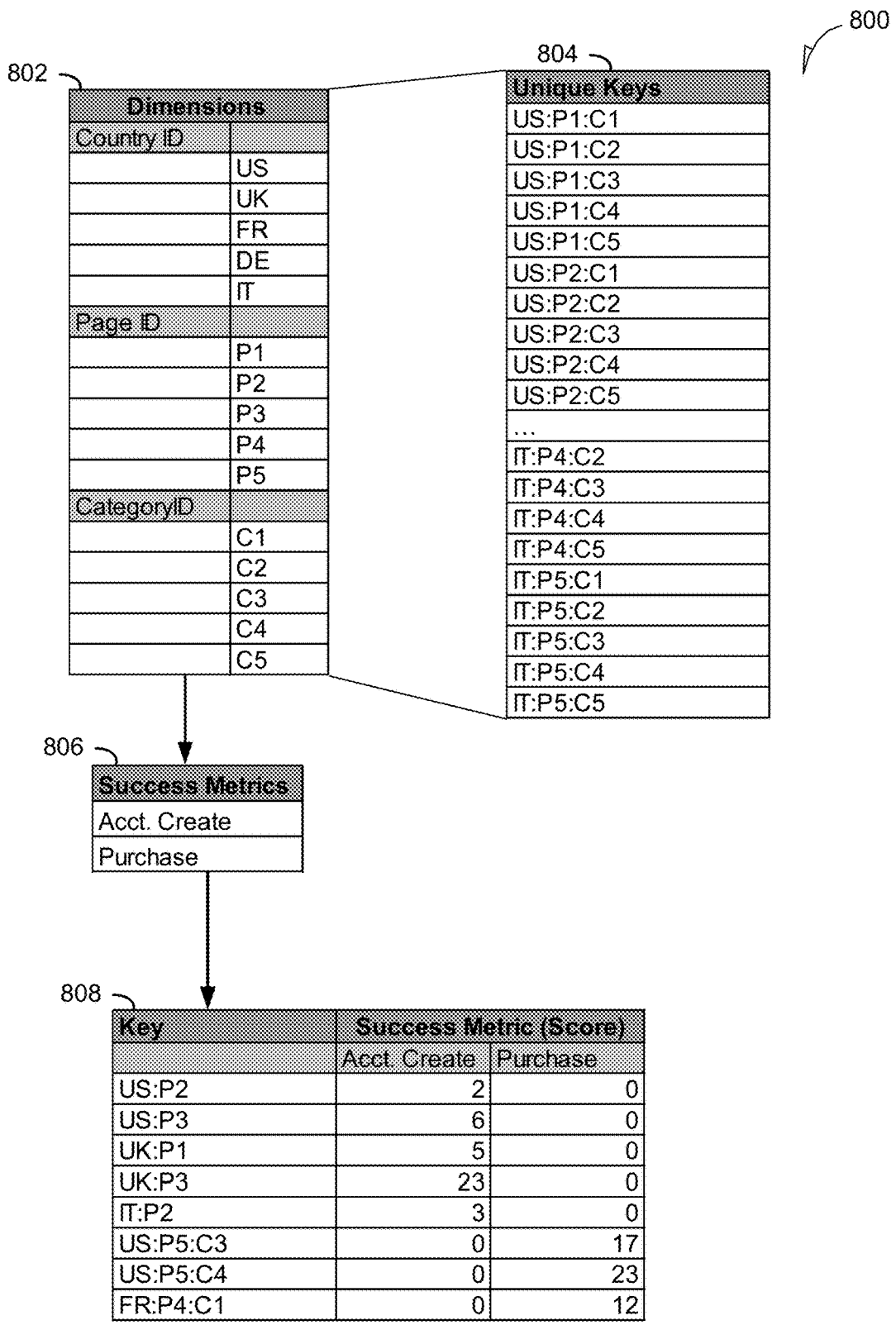
FIG. 8 is a block diagram illustrating aggregation of data and an example output table, according to an example embodiment.

FIG. 8 is a block diagram illustrating aggregation of data and an example output table 808, according to an example embodiment. Table 802 depicts the target dimensions selected for this example, which include Country ID, Page ID and Category ID. In an embodiment, the dimension depicted in table 802 would create one hundred and twenty five (125) unique keys (five (5) Country ID multiplied by five (5) Page IDs multiplied by five (5) Category IDs). Table 804 depicts an example nineteen (19) of the one hundred and twenty five (125) possible unique keys. Example success metrics are depicted in table 806 including account creation and purchases. Output table 808 depicts example results of the data extraction and aggregation methods illustrated in FIG. 4 or 6.

FIG. 9 illustrates a results table, according to an example embodiment. The results table 900 illustrates example output from an example photo sharing online application. The results table 900 depicts a three element dimension key including page ID, module ID and configuration ID. Additionally, the results table 900 depicts three potential success metrics tracked for this example including, account creation (Acct. Create), photo library creation (Lib. Create), and photo uploads. In an embodiment, assuming there was a total of 10 potential page IDs, 5 potential module IDs, and 8 potential configuration IDs, the results table 900 is depicting seven (7) out of a total four hundred (400) unique dimension keys.

FIGS. 10 and 11 are code listings illustrating a data extraction scheme, according to an example embodiment. In an embodiment, the code illustrated in FIGS. 10 and 11 implements a data extraction scheme focus on recovering target data concerning search metrics within an online auction system. In certain examples, the illustrated code can be implemented within a wide variety of applications and environments. The code defines how events will be extracted by the data extraction module 304. The code illustrated in FIG. 11 defines three tracked pages targeted for data extraction and four success metrics (or success events) to be scored. In this embodiment, the success metrics are item views (ViewItem), watch item (WatchItem), bidding on an item (Bid), and purchase actions (Bin). The last portion of the code illustrated in FIG. 11 depicts an example set of dimensions.

Relationship Between Tracking Events and Dimensions

In an embodiment, a tracking event can determine an incoming event that has the potential to be tracked. Once the tracking event enters into the system a tracked entity (tracked page) can be created inside the user session. When an event comes into the system, all the properties defined for the event (defined in the properties section of event definition) get extracted from the event by the user implemented event loader. These properties are used later to populate dimensions.

In an embodiment, the event loader may not be equipped to extract all the keys just from a single event. In this embodiment, a user can still populate those from a tracked page handler.

A dimension can be populated automatically if there is a populated matching key in the event (name exactly matches) otherwise code can be implemented inside a tracked event handler subroutine to populate the dimensions.

Figure 12:
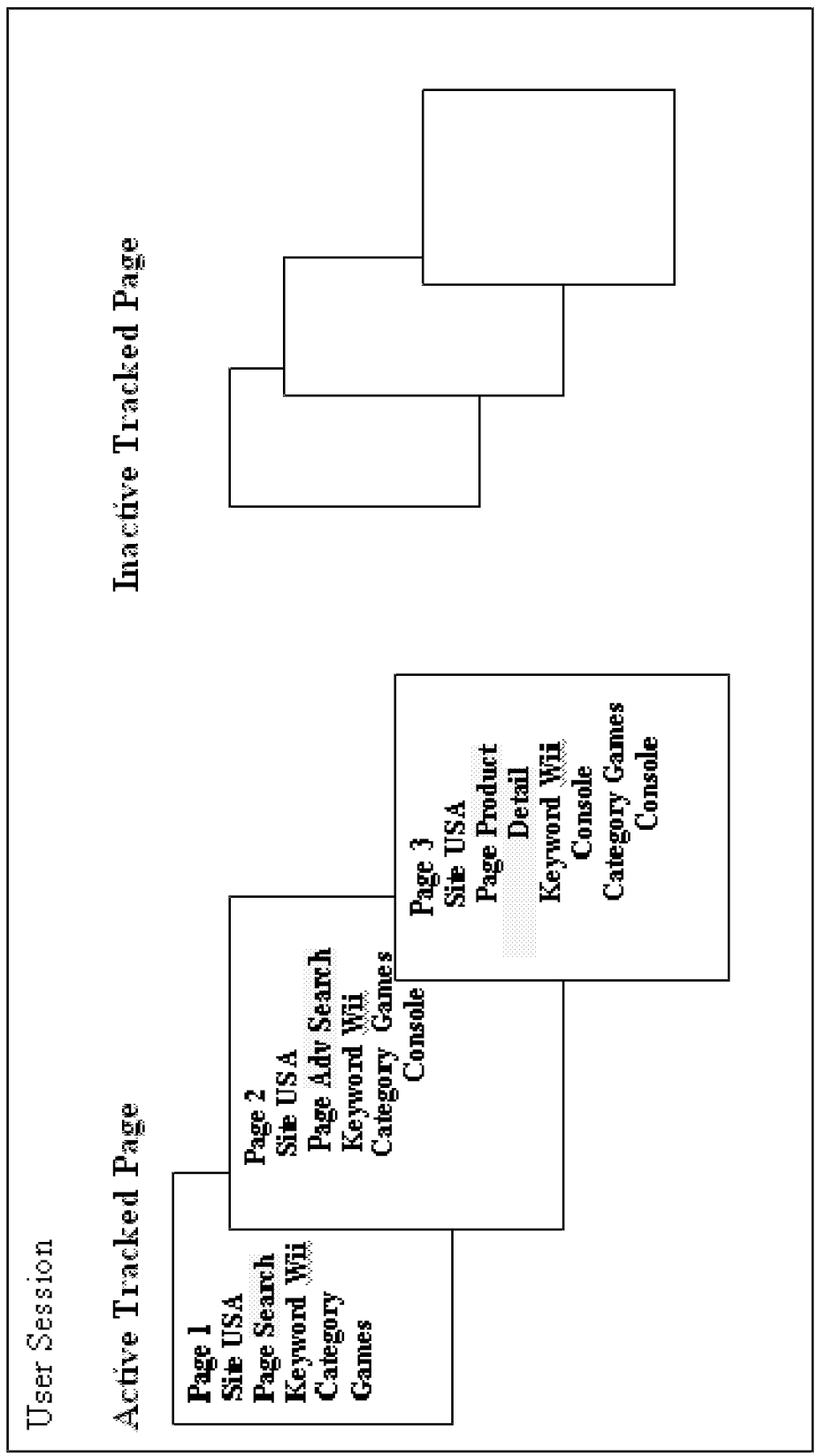
FIG. 12 is a block diagram illustrating the relationship between active tracked pages and inactive tracked pages, according to an embodiment.

FIG. 12 is a diagram illustrating an example relationship between active tracked pages and inactive tracked pages, according to an embodiment.

In an embodiment, in order to support analytical report generation two sequences of tracked pages can be maintained (Active Pages and Inactive Pages). Once a new tracked event (e.g., a page accessed by user) is identified by the system, the parent tracked event (e.g., the parent page) is identified and the parent-child relationship is maintained. In some embodiments, the user may press the back button multiple times and then visit a new page, the parent is found of the last received tracked event that is no longer a leaf in the active tracked page list and then all pages after the parent page are moved into an inactive pool.

Dimension Scoring:

In an embodiment, each time an action event enters into the system, an action handler determines where to assign a score and how to assign (assign the full score to a single tracked event or distribute). In an example, the action handler can be implemented within the data extraction module 304.

In an embodiment, either is a separate handler for different action events. The handler first checks the parent tracked event. If parent event exists in an active page list and not the leaf one in the list it removes the ones in front of it to inactive pool to make it the last one. Now it divides the whole score allotted for that event among the parent page and its ancestor.

In an embodiment, the scoring algorithm is configurable. At least three methods of scoring can be accessed via user configuration:

Allot the full score to the page which is the parent of the action event

Distribute the score evenly among all pages in the chain.

Distribute it such way that individual score will be inversely proportional to distance between the page and action event.

$$S = X(1 - R^N)/(1 - R)$$

S=total score
X=score allotted to the parent tracked page of action event
R=Multiplication factor at each level (value should be less than 1 to ensure grand-parent gets lesser credit than parent).
N is the total no. of tracked events in the tracked event chain.

In an embodiment, the user session includes a chain of active tracked events and a chain of inactive tracked events. A tracked event contains a set of dimension keys. Once an action happens the action score (success metric) is assigned by distributing it to multiple tracked events. Once a score is assigned to a tracked event the whole dimension key combination gets the score. Once the user session ends all active and inactive tracked events are traversed to retrieve the dimension key and score and pass it to map reduce framework. While traversing if the same dimension key set is encountered in two different tracked events then the score is combined using a score aggregator helper class that may be provided by a user.

In an embodiment, inside the map reduce framework, once it finds two exactly same dimensions key set it can invoke the a score aggregrator to combine the score. In an example, the score aggregator can be implemented within the data compression module 306.

Platform Architecture

FIG. 1 is a system block diagram illustrating an online networked application system 100, according to an example embodiment. A networked system 102, in the example, forms a network-based marketplace or publication system, and provides server-side functionality, via a network 104 (e.g., the Internet or Wide Area Network (WAN)) to one or more clients. FIG. 1 illustrates, for example, a web client 106 (e.g., a browser, including the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. In some examples, the application servers 118 can host other applications used to generate or manipulate data. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, including the U.S. dollar, or a proprietary currency, including "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Modules, Components and Logic

Certain embodiments are described herein as including logic or a number of components, modules, or mechanisms. A module is tangible unit capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. For example, a module may comprise dedicated circuitry or logic that is permanently configured (e.g., as a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different component at a different instance of time.

Modules can provide information to, and receive information from, other modules or system components. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS) implementation. For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
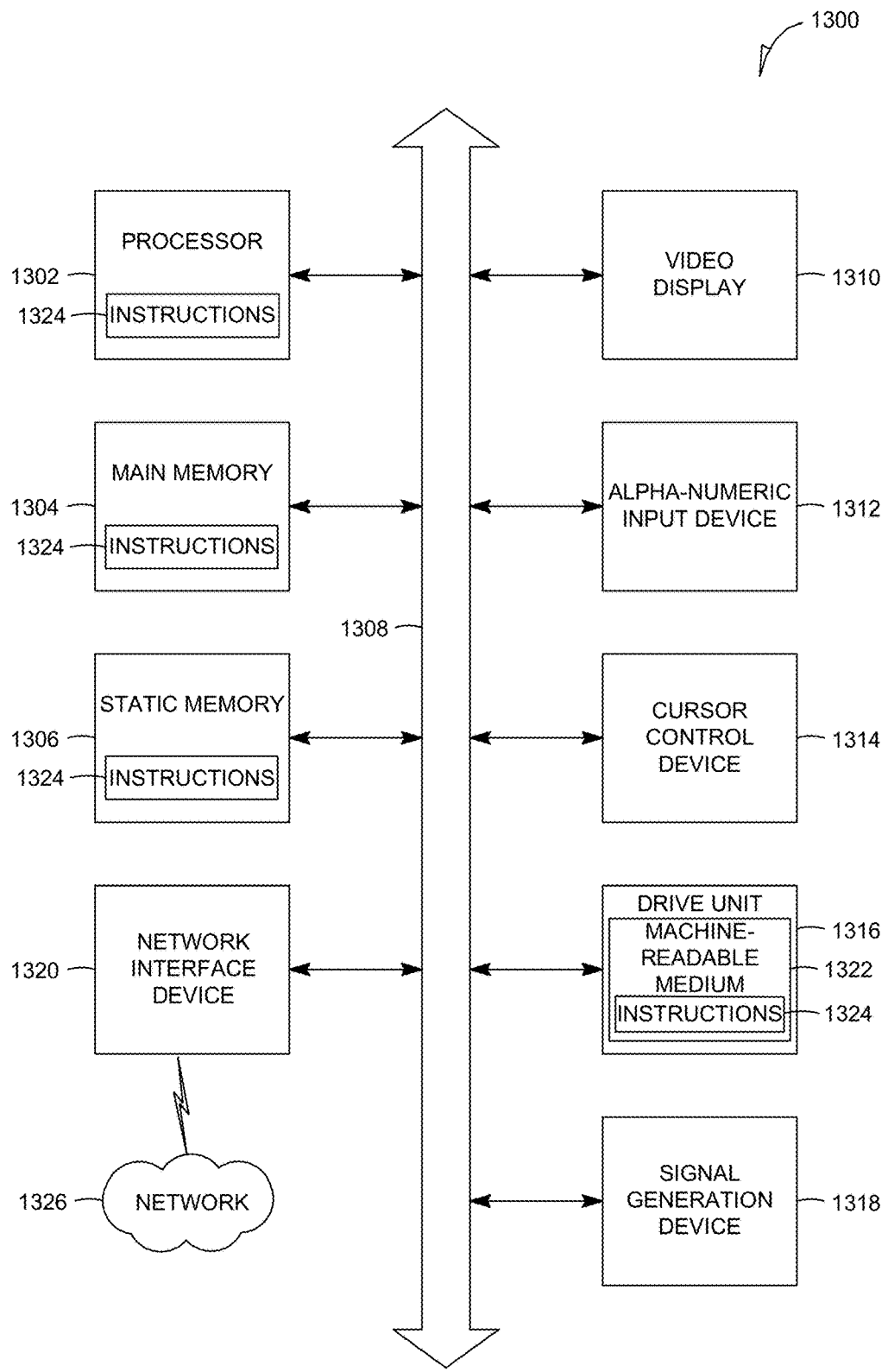
FIG. 13 is a block diagram of machine in the example form of a computer system within which set instructions, for causing the machine to perform any one or more of the methodologies discussed herein, may be executed.

FIG. 13 is a block diagram of machine in the example form of a computer system 1300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a disk drive unit 1316, a signal generation device 1318 (e.g., a speaker) and a network interface device 1320.

Machine-Readable Medium

The disk drive unit 1316 includes a machine-readable medium 1322 on which is stored one or more sets of instructions and data structures (e.g., software) 1324 embodying or utilized by any one or more of the methodologies or functions described herein. The instructions 1324 may also reside, completely or at least partially, within the main memory 1304 and/or within the processor 1302 during execution thereof by the computer system 1300, the main memory 1304 and the processor 1302 also constituting machine-readable media.

While the machine-readable medium 1322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible, non-transitory, medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks including internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol including a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network including an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system comprising:
a non-transitory computer storing instructions; and
a processor configured to execute instructions to cause the system to:
store, in a data store, transactional data that is received and generated from an online application;

extract, by a processing server, a subset data from the transactional data that meet a pre-defined criteria, the pre-defined criteria including accomplishment of success metrics that indicate performance of one or more particular user actions with respect to the online application;

identify, in response to accomplishment of the success metrics and for each respective success metric, a sequence of tracked events of actions performed by a particular user with respect to the online application that led to accomplishment of the respective success metric;

identify combinations of dimensions of the online application that each correspond to a respective tracked event of the sequence of tracked events, the combinations of dimensions each representing a unique configuration of the online application at the time of the respective tracked event;

identify the combinations of dimensions as leading to accomplishment of respective success metrics in response to the combinations of dimensions corresponding to their respective tracked events that led to accomplishment of their respective success metric;

compress, by the processing server, the subset data into targeted data that comprises a set of aggregate key value pairs that associate each of the success metrics of the met pre-defined criteria with their corresponding combinations of dimensions of the online application in response to identifying that the corresponding combinations of dimensions led to accomplishment of the success metrics, the subset data compressed using a map reduce framework; and store, in a denormalized database, the targeted data.

2. The system of claim 1, executing the instructions further causes the system to:
define a computational block, the computational block including a user session;
define the tracked events;
determine target dimensions based on the combinations of dimensions and in response to the corresponding combinations of dimensions being identified as leading to accomplishment of the success metrics; and
determine the success metric based on the tracked events during the computational block.

3. The system of claim 2, wherein the transactional data is received during the user session beginning with a user login and ending with a user logout.

4. The system of claim 2, wherein the set of aggregate key value pairs associate the success metrics with the target dimensions in which the target dimensions are the keys of the aggregate key value pairs and success metric attributions of the success metrics are the values of the aggregate key value pairs.

5. The system of claim 2, wherein the tracked events receive a success metric score.

6. The system of claim 1, wherein the denormalized database comprises a flat table structure.

7. The system of claim 1, wherein a report is generated using the targeted data in the denormalized database.

8. A method comprising:
storing, in a data store, transactional data that is received and generated from an online application;
extracting, by a processing server, a subset data from the transactional data that meet a pre-defined criteria, the pre-defined criteria including accomplishment of a success metric that indicate performance of one or more particular user actions with respect to the online application;

identifying, in response to accomplishment of the success metric a sequence of tracked events of actions performed by a particular user with respect to the online application that led to accomplishment of the success metric;

identifying a combination of programmable aspects of the online application that corresponds to the sequence of tracked events in which each programmable aspect of the combination of programmable aspects corresponds to a respective tracked event of the sequence of tracked events;

identifying the combination of programmable aspects as being generated during accomplishment of the success metric in response to the combination of programmable aspects corresponding to the sequence of tracked events;

compressing, by the processing server, the subset data into targeted data that comprises an aggregate key value pair that associates the success metric with the combination of programmable aspects based on the combination of programmable aspects being identified as being generated during accomplishment of the success metric, the subset data compressed using a map reduce framework; and storing, in a denormalized database, the targeted data.

9. The method of claim 8, further comprising:
defining a computational block, the computational block including a user session;
defining the tracked events;
determining target dimensions based on the combination of programmable aspects and in response to the combination of programmable aspects being identified as leading to accomplishment of the success metric; and
determining the success metric based on the tracked events during the computational block in which the success metric is determined from particular tracked events that lead to the online application having the target dimensions.

10. The method of claim 9, wherein the transactional data is received during the user session beginning with a user login and ending with a user logout.

11. The method of claim 9, wherein the aggregate key value pair associates the success metric with the target dimensions in which the key of the aggregate key value pair is based on the target dimensions and in which the value of the key value pair is based on a success metric attribution of the success metric.

12. The method of claim 9, wherein the tracked events receive a success metric score.

13. The method of claim 8, wherein the denormalized database comprises a flat table structure.

14. The method of claim 8, wherein a report is generated using the targeted data in the denormalized database.

15. A non-transitory machine-readable medium comprising a plurality of machine-readable instructions, the instructions executable to perform operations comprising:
storing, in a data store, transactional data that is received and generated from an online application;
extracting, by a processing server, a subset data from the transactional data that meet a pre-defined criteria, the pre-defined criteria including accomplishment of success metrics that indicate performance of one or more particular user actions with respect to the online application;

identifying, in response to accomplishment of the success metrics and for each respective success metric, a sequence of tracked events of actions performed by a particular user with respect to the online application that led to accomplishment of the respective success metric;

identifying combinations of dimensions of the online application that each correspond to a respective tracked event of the sequence of tracked events, the combinations of dimensions each representing a unique configuration of the online application at the time of the respective tracked event;

identifying the combinations of dimensions as leading to accomplishment of respective success metrics in response to the combinations of dimensions corresponding to their respective tracked events that led to accomplishment of their respective success metric;

compressing, by the processing server, the subset data into targeted data that comprises a set of aggregate key value pairs that associate each of the success metrics of the met pre-defined criteria with their corresponding combinations of dimensions of the online application in response to identifying that the corresponding combinations of dimensions led to accomplishment of the success metrics, the subset data compressed using a map reduce framework; and storing, in a denormalized database, the targeted data.

16. The non-transitory machine-readable medium of claim 15, further comprising:
defining a computational block, the computational block including a user session;
defining the tracked events;
determining target dimensions as the combinations of dimensions and in response to the corresponding combinations of dimensions being identified as leading to accomplishment of the success metrics; and
determining the success metrics based on the tracked events during the computational block.

17. The non-transitory machine-readable medium of claim 16, wherein the transactional data is received during the user session beginning with a user login and ending with a user logout.

18. The non-transitory machine-readable medium of claim 16, wherein the set of aggregate key value pairs associate the success metrics with the target dimensions in which the target dimensions are the keys of the aggregate key value pairs and success metric attributions of the success metrics are the values of the aggregate key value pairs.

19. The non-transitory machine-readable medium of claim 16, wherein the tracked events receive a success metric score.

20. The non-transitory machine-readable medium of claim 16, wherein the pre-defined criteria includes the tracked events and target dimensions.

* * * * *